May 28, 1963 H. T. SPARROW 3,091,393
FLUID AMPLIFIER MIXING CONTROL SYSTEM
Filed July 5, 1961 2 Sheets-Sheet 1

INVENTOR.
HUBERT T. SPARROW
BY
*Alfred N. Feldman*
ATTORNEY

May 28, 1963  H. T. SPARROW  3,091,393
FLUID AMPLIFIER MIXING CONTROL SYSTEM
Filed July 5, 1961  2 Sheets-Sheet 2

INVENTOR.
HUBERT T. SPARROW
BY Alfred N. Feldman
ATTORNEY

United States Patent Office 3,091,393
Patented May 28, 1963

3,091,393
FLUID AMPLIFIER MIXING CONTROL SYSTEM
Hubert T. Sparrow, Edina, Minn., assignor to Minneapolis-Honeywell Regulator Company, Minneapolis, Minn., a corporation of Delaware
Filed July 5, 1961, Ser. No. 122,001
10 Claims. (Cl. 236—12)

The present invention is directed to a fluid control system, more specifically it is directed to a hot water mixing system for the utilization of a single hot water tank for the supply of an intermixed or temperature controlled water flow at various locations in a home or building. In the usual home or building there is a hot water tank which has an inlet connected to the main water supply for the building, and a plurality of outlets connected to the individual locations in the building that require a supply of hot water. In addition to the hot water connection there is usually also a separate cold water connection so that an intermixed water is available at each point in the building that needs a water supply. This type of an arrangement entails a great deal of high pressure plumbing that is currently quite expensive both from a material standpoint and from an installation standpoint.

Since the advent of the fluid amplifier, which is a fluid switching device having no moving parts, it is possible to develop a fluid control system that has a reduced number of plumbing connections and which is capable of supplying controlled temperature water at any point throughout a building in an economical fashion. The fluid amplifier has become well known in the literature and is generally a device that is capable of switching an inlet fluid between a single inlet and two or more outlets depending on a pressure differential applied across the inlet fluid. This type of a device has no moving parts within itself but operates merely on pressure differentials. Since fluid amplifiers have become common in the literature, it is believed that a detailed discussion of their principle of operation is unnecessary. It should be noted that there are a number of different types of fluid amplifiers and these are discussed in the introduction to the United States Patent 3,001,698 which issued September 26, 1961. Another type of fluid amplifier that utilizes an induction control principle, and assigned to the present assignee, was filed by Richard J. Reilly on November 16, 1960, and assigned the Serial No. 69,645, now Patent No. 3,030,979. Since the particular type of fluid amplifier involved is not material, a consideration of existing literature and the above two references will clearly disclose to one skilled in the art the mode of carrying out the invention that will be described in detail in the present application.

Since the installation of hot water systems for sinks and showers in a house or building has become quite expensive due to the extensive copper piping needed, it will become apparent that the present invention can overcome one of the major cost elements in a plumbing installation. The present invention, due to its configuration, can utilize a low pressure, single pipe from a point close to the hot water tank in the building to each of the desired outlets in the building. Since the pipes are of a low pressure nature they could readily be of plastic and could be run in a much more economical fashion than the dual copper or metal pipes currently used in plumbing practice.

By placing the mixing valve close to the main line and to the source of hot water, less fluctuation in temperature at a given outlet will occur if sudden demands for flow to other outlets are made. Further, the system will be less affected by pressure changes within the "hot" or "cold" distribution pipes. With a mixing valve such as this, the temperature of the water in the water heater tank can be kept at a higher level, thereby increasing the capacity of the heater and making it possible to provide very hot water to those appliances that safely can use it.

It is a primary object of the present invention to disclose a fluid control system, more particularly a hot water supply system that utilizes a fluid amplifier at the hot water tank, for each location in the building that must be supplied with hot water and the further utilization of but a single pipe from each fluid amplifier to the utilization point.

It is a further object of the present invention to disclose a multiple use of fluid amplifiers with a single hot water tank to supply controlled hot water to as many individual locations as is desired from one supply source.

Yet a further object of the present invention is to disclose a fluid control system wherein the temperature of the control fluid can be remotely controlled so that the supply fluid is properly mixed and supplied to the outlet at the desired temperature.

Yet another object of the present invention is to disclose a fluid mixing system that utilizes a minimum of moving parts in the control of a fluid amplifier that in itself contains no moving parts.

Still a further object of the present invention is to disclose a simplified hot water system for a building that is economical to install due to the reduction in the amount of plumbing required in its installation.

It is yet another objective of the present invention to disclose a simplified hot water system that has a minimum of fluctuation of water temperature and which can be operated at higher temperatures than are now available.

These and other objects will become apparent when the drawings of the present application are considered in detail along with the present specification.

Figure 1:
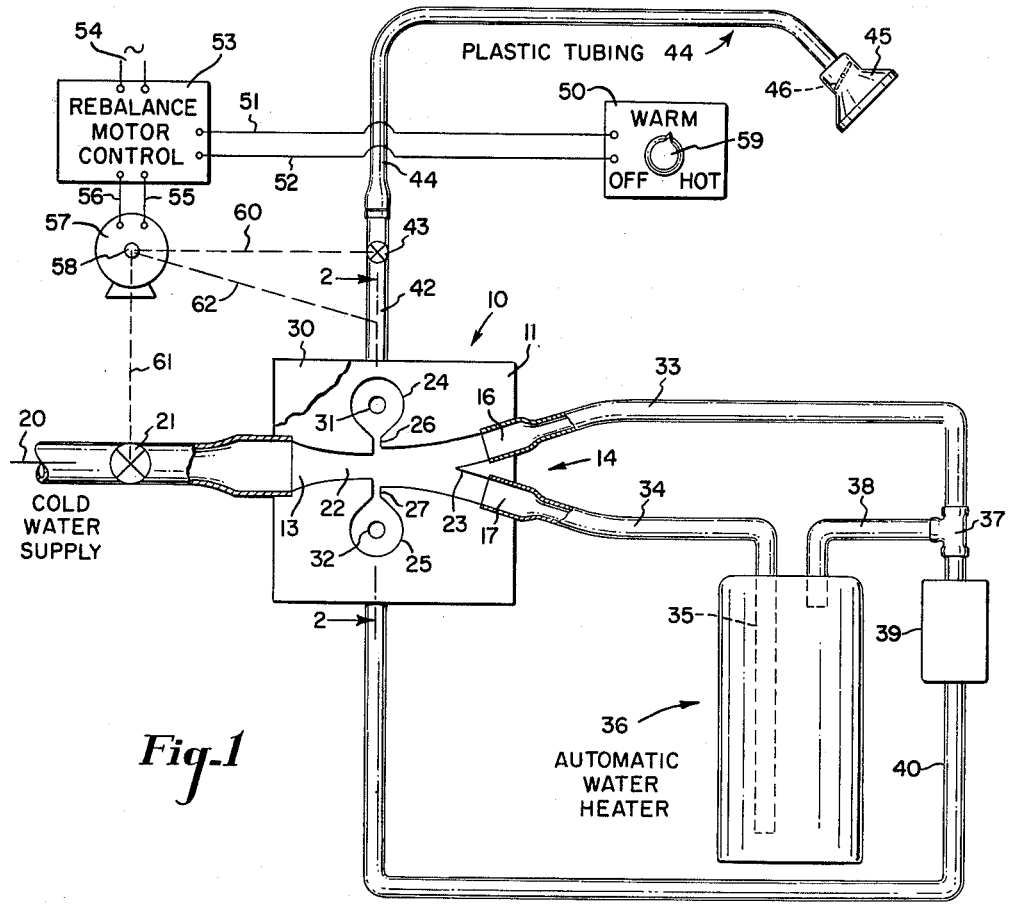
FIGURE 1 is a schematic representation of a shower control system utilizing the present invention when associated with a remote control shower type installation.
Figure 2:
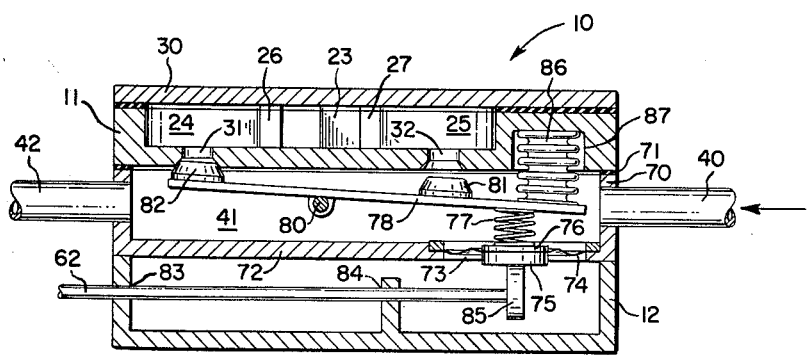
FIGURE 2 is a cross section of the fluid amplifier and associated temperature control means taken along lines 2—2 of FIGURE 1.

Considering the system of FIGURE 1 and the details in FIGURE 2, there is disclosed generally at 10 a fluid amplifier system which includes both a fluid amplifier means 11 and a condition control means 12 beneath the fluid amplifier means 11. The fluid amplifier 11 is of the type disclosed in the Patent 3,001,698, previously mentioned, and includes inlet means 13 and outlet means 14. Outlet means 14, in this particular case, includes two outlets 16 and 17. The fluid amplifier means 11 is connected by the inlet means 13 to a source of fluid 20, which will be referred to as a cold water supply. It should be understood that the present description is directed to a water system within a house or building, but the present invention could be used for mixing and controlling any types of fluids such as fluids in chemical processing plants.

The inlet fluid 20 is controlled by a valve means 21 so that the fluid or water 20 can be introduced into the inlet means 13 at the appropriate time. The inlet means 13 is directed to the throat 22 of the fluid amplifier 11 which opens into the outlet means 14. The outlet means 14 has a splitter 23 and the fluid flowing through the inlet means 13 is directed either into outlet 16 or outlet 17 on one side or the other of the splitter 23. The direction that the fluid takes is dependent on a pressure differential that occurs between a pressure chamber 24 and a pressure chamber 25. The pressure chambers each have connecting jets or inlets 26 and 27 for the introduction of the pressure differential fluid. The structure described so far would normally be made up of a cast block of material, which could be metal, plastic, or any other suitable form of material. This block of material must be sealed in a fluid tight manner at all joints and a cover 30 is placed over the cutaway as shown in FIGURE 1 to complete the sealing of the unit in a fluid tight fashion.

Introduced into the pressure chamber 24 is a fluid control port 31 while a control port 32 is introduced in the bottom of the chamber 25. The function of the control ports 31 and 32 will be described subsequently. The outlet means 14 has a pair of pipes 33 and 34 leading away respectively from the outlets 16 and 17. The pipe 34 is connected to an inlet pipe 35 of an automatic water heater generally shown at 36. The automatic water heater 36 is of a conventional design and automatically cycles to supply a tank full of hot water so that water introduced at the bottom is heated and is available at the top of the tank 36 as hot water. The pipe 33 is connected to a T 37 which in turn in connected to a water outlet pipe 38 from the automatic water heater 36 and to an intermixed fluid pipe 40. In pipe 40 at 39 may be a mixing chamber if that is found desirable.

In operation of this one area it is obvious that when water is forced into pipe 35 to the automatic water heater 36, that hot water flows through pipe 38 into the T 37 where it can be mixed with water coming from pipe 33.

The water mixed in the T 37 or mixing tank 39 flows in pipe 40 to a condition responsive section 41 (FIGURE 2) of the condition responsive means 12 which is attached to the bottom of the fluid amplifier means 11. The water flowing in pipe 40 to the condition responsive section 41 causes the condition responsive means 12 to react in a manner that will be described subsequently. The water then flows out of outlet pipe 42 and through a control valve means 43 to a pipe for utilization of the flowing fluid. The utilization pipe in this case has been shown as pipe 44, made of plastic. The plastic pipe or tubing 44 leads to a conventional shower head 45 that is controlled by a variable flow means 46 in a conventional fashion.

The operation of the apparatus of FIGURE 1 is controlled by a control means 50 which supplies an electric remote control signal on conductors 51 and 52 to a motor control means 53 that is supplied at 54 from a convential source of electric power. The output of the motor control means 53 is on conductors 55 and 56. The motor control means 53 can take the form of a conventional bridge rebalance motor control system that operates over the conductors 55 and 56 to drive or control a motor 57 that has an output shaft 58. The output shaft 58 is connected mechanically at 60 to valve means 43 and by a mechanical connection 61 to the valve means 21. The motor shaft 58 further directly drives a shaft 62 that is connected to the condition responsive control means 12. It should be understood that the remote control means 50 can cause the positioning of the motor shaft 58 through any of many conventional electric or mechanical means and that this means forms no direct part of the present invention. By way of example, if the control means 50 contains a potentiometer causing an unbalance of a bridge system for driving a rebalance bridge motor, the position of the knob 59 will cause the shaft 58 to rotate in a corresponding manner. When the knob 59 is set at an "off" position, the rebalance bridge motor causes shaft 58 to be positioned so that valve means 21 and valve means 43 are in a fully closed position. At the same time shaft 58 causes a mechanical linkage 62 to position the condition responsive means 12 so as to provide the coldest possible water in the system as soon as the system is put into operation. If the knob 59 is rotated to a "warm" or "hot" position, the rebalance bridge arrangement causes shaft 58 to rotate immediately opening valve means 21 and valve means 43 to their full open position. The position of knob 59 causes the shaft 58 to further position part of the condition responsive means 12 in a manner that will control the temperature of the water in the plastic tubing 44 which is thus supplied to the shower 45. The mode of obtaining this variation in temperature will become apparent with the subsequent description.

In considering the device of FIGURE 1, it is understood that cold water supplied to the inlet means 13 flows past the control ports 26 and 27 and the flow of water is in outlet 16 or outlet 17. If the original condition of the amplifier means 11 is such that the water flowing from the inlet means 13 flows directly to the outlet 16 it is apparent that water flows through the fluid amplifier means 11, into pipe 33, where it bypasses the automatic water heater 36 and flows into pipe 40. The flow of cold water into pipe 40 directs the cold water into the condition responsive section 41 and then back out through pipe 42 to the shower 45. If the shower control knob 59 is calling for cold water, a jet of fluid is supplied into the pressure equalizing chamber 25 through the control port 32 thereby keeping the flow of fluid from the inlet means 13 directed into the outlet 16. If the present unit is not set for cold water, but rather is set for "warm" or "hot" water, the condition responsive section 41 operates in such a fashion as to open the control port 31 thereby directing a jet of fluid into the side of the fluid amplifier means 11 to cause the flow of inlet water from the inlet means 13 to the outlet 17. The flow of cold water is passed from outlet 17 into pipe 34, where it is fed into the automatic water heater 36 and forces out hot water through pipe 38. The hot water in pipe 38 is then fed to the T 37 and pipe 40 where it is in turn fed into the condition responsive section 41. If the temperature of the water is satisfactory, the system remains balanced. If the temperature of the water flowing into the condition responsive means is too hot, the condition responsive means switches the flow of control fluid in the fluid amplifier means 11 from the inlet port 31 to the inlet port 32 thereby causing the fluid amplifier means 11 to switch the inlet fluid from the inlet means 13 to the outlet 16. This causes a pulse of cold water to flow into pipe 16 and into the system. It can be appreciated that if the fluid amplifier means 11 oscillates at a sufficient rate that pulses of hot and cold water are mixed in the T 37, or mixing chamber 40A and thus supplied to the condition responsive section 41, which in turn supplies the water to the shower. The supply of pulsing or oscillating fluid thus adjusts the temperature for the shower 45 in response to the position of the knob 59 by positioning the shaft 58 which in turn controls the sensing of the condition responsive section 41. The description of the condition responsive means is of one of many possible configurations of condition responsive means for alternately switching fluid flow between the ports 31 and 32. It is understood that many expedients for the switching, while available, form no detailed part of the present invention and only one way has been shown as an example of carrying out the present invention.

In FIGURE 2, the details of the condition responsive means 12 which switches the flow of fluid from control port 31 to control port 32 in response to the temperature of the water is shown. The water comes in in pipe 40 to the condition responsive section 41, which is a fluid tight chamber having the outlet pipe 42 and the control ports 31 and 32 opening therein. The condition responsive section 41 has a sealed chamber 70 which is sealed fluid tight by gasket 71. The bottom wall 72 has an opening 73 that is sealed by a flexible diaphragm 74 that has a pair of plates 75 and 76 on opposite sides for strengthening the center section of the diaphragm.

The diaphragm supports a spring 77 that is mounted against the bottom of a pivoted lever 78 that is pivoted around a point or shaft 80. The lever 78 has two valve members 81 and 82 that are placed along the lever 78 so that they will operate alternately against the ports 31 and 32. It will be appreciated that by rocking the lever 78, and thereby opening and closing ports 31 and 32, it is possible to alternately switch the fluid amplifier means 11 back and forth between the outlets 16 and 17. The means of setting the proper bias or temperature into the condition responsive means 12 is by shaft 62 which is attached to the motor shaft 58. Shaft 62 passes through a journal 83 and a second support journal 84. The end of the shaft 62 has a cam 85 that rides against the plate 75 for adjusting the compression of spring 77. The cam 85 is not symmetrically placed on shaft 62 and thus varies the pressure on the plate 75 and the bias on the spring 77 as the shaft 62 is rotated. With the arrangement just described the rotation of shaft 62 can vary the effect of the spring 77 on the bottom of the lever 78.

The lever 78 holds a bellows 86 in a detent 87 in the bottom of the fluid amplifier means 11. The bellows 86 is filled with a highly volatile fluid and makes the bellows 86 responsive to temperautre. As the temperature around the bellows 86 increases, the volatile fluid in the bellows 86 expands thereby causing the bellows 86 to expand. This is a completely sealed unit and is similar to many temperature sensing type units used in thermostats and other types of temperature responsive controls. The effect of the bellows 86 is to oppose the spring 77 in such a fashion as to vary the levers 78 in position around the pivot 80 depending on the temperature of fluid in the temperature responsive section 41. It will thus be appreciated that as water flows in pipe 40, it flows past the bellows 86 and causes the bellows to expand or contract depending on the temperature of the water present. If the bellows 86 expands and compresses spring 77 the port 31 is closed thereby deflecting the flow of inlet fluid by the control port 32 being fully opened. The control port 32 causes the fluid amplifier means 11 to switch causing cold water to flow into pipe 33 which in turn causes the water to flow to the condition responsive section 41. As the cooler water enters pipe 40 and passes by the bellows 86, the bellows begins to contract thereby starting to close the port 32 and opening the port 31. As the port 31 is opened more than port 32 the fluid amplifier means 11 switches directing the cold water from inlet means 13 to the outlet 17 through the automatic water heater thereby increasing the water temperature. The effect is to cause the lever 78 to sit and rock rapidly changing the pressure differential across the fluid amplifier means 11 thereby switching the fluid flow between outlets 16 and 17 to maintain a temperature responsive to the setting of the compression of spring 77 with the opposition of the bellows 86.

To this point there has been described a temperature control means wherein cold water is fed into a fluid amplifier means and is oscillated or modulated between two outlets for temperature control through or around an automatic water heater. The water flows into a shower and can be adjusted in temperature by a remote means 50. It will be appreciated that from the outlet pipe 42 and valve means 43 there is nothing but a low pressure water supply. By being able to turn off valve means 43 there is no pressure remaining in the plastic tubing 44 when the system is shut down. For this reason it is possible to mount the equipment shown in FIGURES 1 and 2 at the water heater and run a single plastic tube from this unit at the automatic water heater to any place in a building or house for use in a shower or other water outlet. The adjustment of the temperature is controlled by the control means 50 along with the rebalance bridge motor control 53. The system just described is in and of itself a complete system and could be used separate from any other water system in a building or house.

Figure 3:
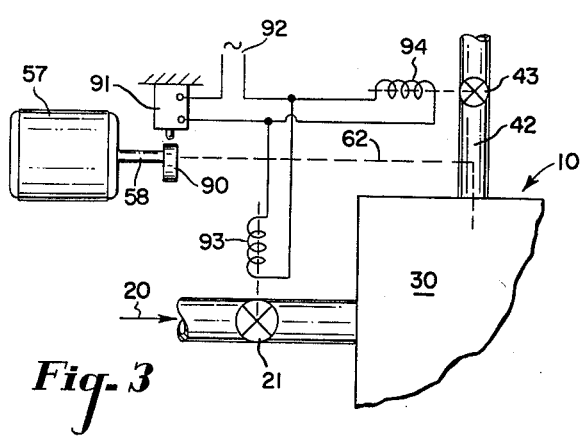
FIGURE 3 is a partial schematic of a second remote control arrangement that can be substituted for the remote control arrangement of FIGURE 1.

In FIGURE 3 there is disclosed a second means of operating the valve means 21 and 43. More specifically, the motor 57 driving shaft 58 and the shaft linkage 62 to the fluid amplifier system 10 also operates a cam 90. In this particular case there are no mechanical linkages between the shaft 58 and the valve means 21 or valve means 43. The cam 90 is offset and is shaped so as to initially operate a switch means 91. Switch means 91 is closed by the initial rotation of shaft 58 by the cam 90 and remains closed for the balance of rotation of the shaft 58 in controlling the temperature of the fluid amplifier system 10. A conventional power source 92 is supplied through the switch means 91 to solenoid operators 93 and 94 that are associated with the valve means 21 and 43. It is thus apparent that the initial movement of the shaft 58 opens both valve means 21 and 43 fully and these valve means stay open during the rest of the rotation of shaft 58 and the control inlet shaft 62 to the temperature responsive section 41 of the fluid amplifier system 10. The modification just shown would simplify the mechanical installation of the unit by utilizing electrical circuits for the operation of the valve means as opposed to mechanical linkages for the necessary valves.

Figure 4:
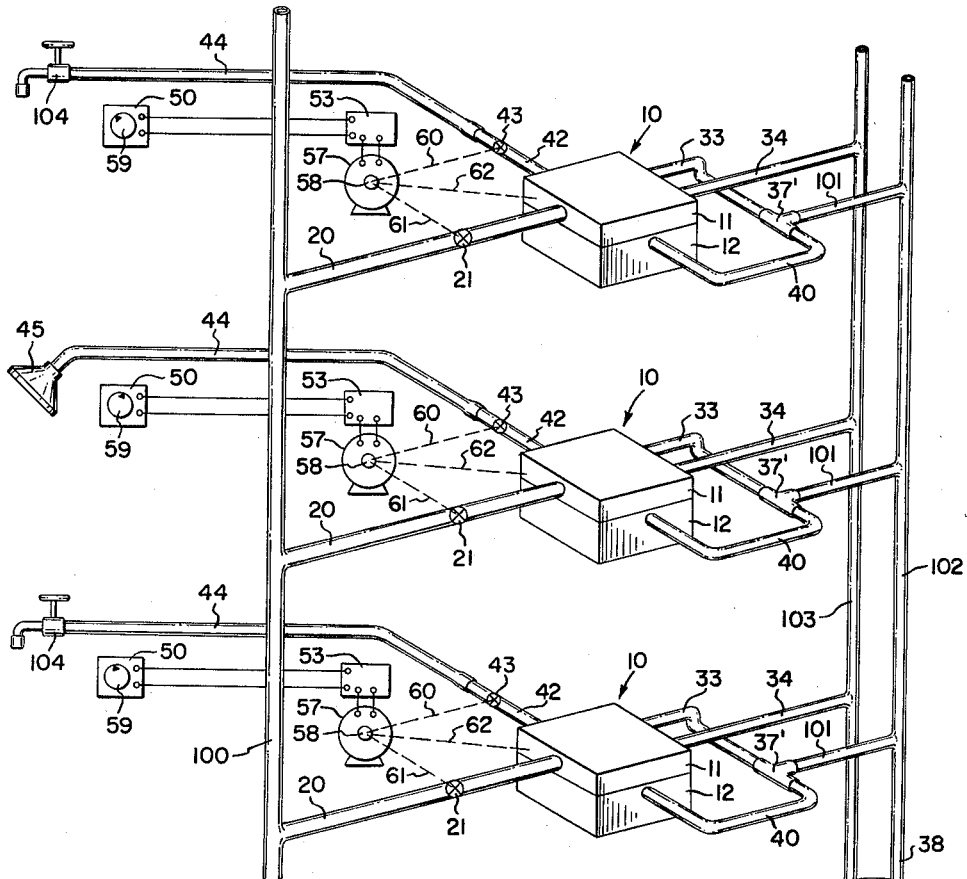
FIGURE 4 is an isometric schematic of a fluid control system wherein a group of fluid amplifiers and control devices are grouped for remote control of three or more outlet means.

In FIGURE 4 there is disclosed a system wherein a single automatic water heater 36 is hooked into a system utilizing, for example, three fluid amplifier systems 10. Each of the fluid amplifier systems 10 has identical inlet and outlet configurations to those disclosed in FIGURE 1, and in addition has identical control systems to that disclosed in FIGURE 1. A detailed description of this part of the system will not be undertaken as it is believed that the correspondence between the units can be readily followed by following the corresponding numbering.

In addition to the inlet pipes 20, there is a common cold water pipe 100 that joins these inlets and any other outlet of cold water needed in the particular building or house. All of the pipes 33 pass through their appropriate mixing T's 37' which in turn are connected to pipes 101 to a common hot water outlet stand 102. As indicated by the isometric schematic, the arrangement of FIGURE 1 could be stacked up so that any number of units could be used. Further, the outlet pipe 34 in each case is connected to a common stand 103 for the inlet of the automatic water heater 36. The outlet pipes 42 and outlet valve means 43 in each case are connected to a single plastic pipe 44 that goes to various outlets. In the present case a shower head 45 has been shown with two additional outlets in the form of open spigots 104. Since the outlets 104 do not have to be turned off completely, only a means of reduction of flow is shown. This is similar to the arrangement on the shower 45 and it will be appreciated that the spigots 104 do not have to be shut off completely as they each turn off completely when the control knob 59 is adjusted to the "off" position because of valve means 21 and 43.

In the schematic arrangement disclosed in FIGURE 4, identical units are utilized and are stacked right at the automatic water heater 36. As such, the plumbing in the building is limited to a cold water inlet pipe to the water heater and a common pair of stands from the automatic water heater for connection of the fluid amplifier control systems. Each of the fluid amplifier means 11 has its own condition responsive means 12 attached thereto which is in turn controlled by a remote control means 50 that can be electrically operated from the remote point where water is to be supplied. The only plumbing necessary to run in this case is a single plastic tube 44 to each of the outlets 104 or the shower 45 from a location of the fluid amplifier control systems 10 at the automatic water heater. It will thus be appreciated that the plumbing within a building could be drastically simplified and that materials of much lower cost could be used in running the water from the amplifier system 10 to the point of utilization. This cost reduction can well offset the cost of the fluid amplifiers and their condition responsive means. The arrangement described gives a single handle control of the temperature of water and the complete rate of flow can be adjusted by the particular outlet means utilized. The present system would constitute a substantial cost saving in many installations and has the desirable feature of providing automatic condition responsive control for maintaining the water temperature constant at a set level.

The disclosure of the present application has been by way of example only and forms one of the many possible configurations of installations available to one skilled in the present art. The present application in no way attempts to disclose all of the various arrangements that could be utilized in preparing and utilizing the present invention but has been illustrative only. The applicant wishes to be limited in the scope of his invention only by the appended claims as one skilled in the art could readily change the physical configurations specifically shown without departing from the scope of the present invention.

I claim as my invention:

1. In a fluid control system comprising: fluid amplifier means having inlet means and outlet means; said fluid amplifier means further having control means for application of fluid pressure to switch fluid at said inlet means in said outlet means; a source of fluid connected to said inlet means; fluid conversion means connected to said outlet means to alter the condition of said fluid as said fluid passes through said conversion means; connection means joining said outlet means and said conversion means to intermix the fluid flow from said outlet means with the fluid from said conversion means; and said intermixed fluid connected to an outlet pipe through means responsive to the condition of said intermixed fluid to alter the fluid pressure at said control means to cause said fluid amplifier means to switch in response to said condition responsive means; said fluid amplifier means switching said inlet fluid in said outlet means to control said intermixed fluid in said outlet pipe in response to the condition responsive means.

2. In a fluid mixing control system comprising: fluid amplifier means having an inlet and two outlets; said fluid amplifier means further having control means for application of fluid pressure to switch fluid at said inlet between said outlets; a source of fluid connected to said inlet and switched between said outlets by said amplifier means; fluid conversion means connected to a first of said outlets to alter the condition of said fluid as said fluid passes through said conversion means; connection means joining a second of said outlets and said conversion means to intermix the fluid flow from said second outlet with the fluid from said conversion means; and said intermixed fluid connected to an outlet pipe through means responsive to the condition of said intermixed fluid to alter the fluid pressure at said control means to cause said fluid amplifier means to switch in response to said condition responsive means; said fluid amplifier means switching said inlet fluid between said outlets to control said intermixed fluid in said outlet pipe in response to the condition responsive means.

3. In a fluid mixing control system comprising: a fluid amplifier having an inlet and two outlets; said fluid amplifier further having two control ports for application of fluid pressure to switch fluid at said inlet between said outlets; a source of fluid connected to said inlet and switched between said outlets by said amplifier; fluid conversion means connected to a first of said outlets to alter the condition of said fluid as said fluid passes through said conversion means; connection means joining a second of said outlets and said conversion means to intermix the fluid flow from said second outlet with the fluid from said conversion means; and said intermixed fluid connected to an outlet pipe through means responsive to the condition of said intermixed fluid to alter the fluid pressure at said control ports to cause said fluid amplifier to switch in response to said condition responsive means; said fluid amplifier switching said inlet fluid between said outlets to control said intermixed fluid in said outlet pipe in response to the condition responsive means.

4. In a water mixing control system comprising: a fluid amplifier having an inlet and two outlets; said fluid amplifier further having two control ports for application of water pressure to switch water at said inlet between said outlets; a source of cold water connected to said inlet and switched between said outlets by said amplifier; a hot water tank connected to a first of said outlets to alter the temperature of said water as said water passes through said hot water tank; connection means joining a second of said outlets and said hot water tank to intermix the water flow from said second outlet with the water from said hot water tank; and said intermixed water connected to an outlet pipe through means responsive to the temperature of said intermixed water to alter the water pressure at said control ports to cause said fluid amplifier to switch in response to said temperature responsive means; said fluid amplifier switching said inlet water between said outlets to control said intermixed water in said outlet pipe in response to the temperature responsive means.

5. In a fluid control system comprising: a plurality of fluid amplifier means each having inlet means and outlet means; said fluid amplifier means further each having control means for application of fluid pressure to switch fluid at said inlet means between said outlet means; a common source of fluid connected to each of said inlet means and switched between said outlet means by each said amplifier means; fluid conversion means connected to a first of each of said outlet means to alter the condition of said fluid as said fluid passes through said conversion means; connection means joining a second of each of said outlet means and said conversion means to intermix the fluid flow from each of said second outlet means with the fluid from said conversion means; and said intermixed fluid connected to an individual outlet pipe for each amplifier means through means responsive to the condition of said intermixed fluid for each amplifier means; each said condition responsive means altering the fluid pressure at said control means to cause each said fluid amplifier means to switch in response to said condition responsive means associated therewith; each said fluid amplifier means switching its own said inlet fluid between said outlet means to control said intermixed fluid in its own individual outlet pipe in response to the associated condition responsive means.

6. In a fluid mixing control system comprising: a plurality of fluid amplifiers each having an inlet and two outlets; said fluid amplifiers further each having control ports for application of fluid pressure to switch fluid at said inlets between said outlets; a common source of fluid connected to each of said inlets and switched between said outlets by each said amplifier; fluid conversion means connected to a first of each of said outlets to alter the condition of said fluid as said fluid passes through said conversion means; connection means joining a second of each of said outlets and said conversion means to intermix the fluid flow from each of said second outlets with the fluid from said conversion means; and said intermixed fluid connected to an individual outlet pipe for each amplifier through means responsive to the condition of said intermixed fluid for each amplifier; each said condition responsive means altering the fluid pressure at said control ports to cause each said fluid amplifier to switch in response to said condition responsive means associated therewith; each said fluid amplifier switching its own said inlet fluid between said outlets to control said intermixed fluid in its own individual outlet pipe in response to the associated condition responsive means.

7. In a water mixing control system comprising: a plurality of fluid amplifier means each having inlet means and outlet means; said fluid amplifier means further each having control means for application of water pressure to switch water at said inlet means between said outlet means; a common source of cold water connected to each of said inlet means and switched between said outlet means by each said amplifier means; a hot water tank connected to a first of each of said outlet means to alter the temperature of said water as said water passes through said hot water tank; connection means joining a second of each of said outlet means and said hot water tank to intermix the water flow from each of said second outlet means with the water from said hot water tank; and said intermixed water connected to an individual outlet pipe for each amplifier means through means responsive to the temperature of said intermixed water for each amplifier means; each said temperature responsive means altering the water pressure at said control means to cause each said fluid amplifier means to switch in response to said temperature responsive means associated therewith; each said fluid amplifier means switching its own said inlet water between said outlet means to control said intermixed water in its own individual outlet pipe in response to the associated temperature responsive means.

8. In a fluid control system comprising: fluid amplifier means having inlet means and outlet means; said fluid amplifier means further having control means for application of fluid pressure to switch fluid at said inlet means in said outlet means; a source of fluid connected to said inlet means; fluid conversion means connected to said outlet means to alter the condition of said fluid as said fluid passes through said conversion means; connection means joining said outlet means and said conversion means to intermix the fluid flow from said outlet means with the fluid from said conversion means; said intermixed fluid connected to an outlet pipe through means responsive to the condition of said intermixed fluid to alter the fluid pressure at said control means to cause said fluid amplifier means to switch in response to said condition responsive means; and adjustable remote control means to vary said control means for said fluid amplifier; said fluid amplifier means switching said inlet fluid in said outlet means to control said intermixed fluid in said outlet pipe in response to the condition responsive means and said remote control means.

9. In a water mixing control system comprising: a fluid amplifier having an inlet and two outlets; said fluid amplifier further having two control ports for application of water pressure to switch water at said inlet between said outlets; a source of cold water connected to said inlet and switched between said outlets by said amplifier; a hot water tank connected to a first of said outlets to alter the temperature of said water as said water passes through said hot water tank; connection means joining a second of said outlets and said hot water tank to intermix the water flow from said second outlet with the water from said hot water tank; said intermixed water connected to an outlet pipe through means responsive to the temperature of said intermixed water to alter the water pressure at said control ports to cause said fluid amplifier to switch in response to said temperature responsive means; and adjustable remote control means including means to vary said two control ports to change the switching of said fluid amplifier; said fluid amplifier switching said inlet water between said outlets to control said intermixed water in said outlet pipe in response to the temperature responsive means and said remote control means.

10. In a water mixing control system comprising: a plurality of fluid amplifier means each having an inlet and two outlets; said fluid amplifier means further each having control ports for application of water pressure to switch water at said inlets between said outlets; a common source of cold water connected to each of said inlets and switched between said outlets by each said amplifier means; a hot water tank connected to a first of each of said outlets to alter the temperature of said water as said water passes through said hot water tank; connection means joining a second of each of said outlets and said hot water tank to intermix the water flow from each of said second outlets with the water from said hot water tank; said intermixed water connected to an individual outlet pipe for each amplifier means through means responsive to the temperature of said intermixed water for each amplifier means; and adjustable remote control means for each amplifier means including valve means to control water flow in said system and in said control ports; each said temperature responsive means altering the water pressure at said control ports in response to said remote control means to cause each said fluid amplifier means to switch in response to said temperature responsive means associated therewith; each said fluid amplifier means switching its own said inlet water between said outlets to control said intermixed water in its own individual outlet pipe in response to the associated temperature responsive means; each said remote control means further independently controlling water flow in its associated outlet pipe.

References Cited in the file of this patent

UNITED STATES PATENTS

| 1,022,188 | Geissinger | Apr. 2, 1912 |
| 1,763,666 | Machlet | June 17, 1930 |
| 2,354,997 | Krogh | Aug. 1, 1944 |
| 2,449,766 | Brown | Sept. 21, 1948 |
| 3,001,539 | Hurvitz | Sept. 26, 1961 |

FOREIGN PATENTS

| 253,317 | Great Britain | June 17, 1926 |

OTHER REFERENCES

Control Engineering, May 1960, pages 26, 28 and 30.